United States Patent [19]

Joubert et al.

[11] Patent Number: 5,685,975
[45] Date of Patent: Nov. 11, 1997

[54] DEVICE FOR DISTRIBUTING AND CHANNELING LIQUID WITHIN A WATER TREATMENT

[75] Inventors: Dominique Joubert, Paris; Michel Pecolatto, Gonesse; Martial Sabatier, Clamart; Véronique Tharreau, Paris; Jean Michel Arribard, Rueil Malmaison, all of France

[73] Assignee: BWT France, Rueil Malmaison, France

[21] Appl. No.: 712,391

[22] Filed: Sep. 11, 1996

Related U.S. Application Data

[63] Continuation of Ser. No. 422,541, Apr. 12, 1995, abandoned.
[51] Int. Cl.$^6$ .................................................. C02F 5/00
[52] U.S. Cl. ........................... 210/136; 210/190; 210/269; 210/288; 210/289
[58] Field of Search .................................. 210/136, 275, 210/278, 288, 289, 291, 440, 443, 190, 191, 269

[56] References Cited

U.S. PATENT DOCUMENTS

| | | | |
|---|---|---|---|
| 1,626,055 | 4/1927 | Tannehill . | |
| 3,178,024 | 4/1965 | Jacuzzi | 210/288 |
| 3,319,791 | 5/1967 | Horne | 210/288 |
| 3,474,910 | 10/1969 | Schmerler et al. | 210/288 |
| 3,662,780 | 5/1972 | Marsh | 137/590 |
| 3,704,785 | 12/1972 | Marsh | 210/285 |
| 3,815,747 | 6/1974 | Clack et al. | 210/278 |
| 4,795,563 | 1/1989 | Auchincloss | 210/288 |

*Primary Examiner*—Ivars Cintins
*Attorney, Agent, or Firm*—Pollock, Vande Sande & Priddy

[57] ABSTRACT

A water softening device includes a cylindrical housing with an inlet formed at one end for admitting water to be treated. A filtering material is located in an upstream zone adjacent the inlet. A plate is positioned in relative spaced relation to an opposite end of the housing. A downstream zone, free of filtering material, is located between the plate and the opposite end. Openings are formed in the plate to allow passage of softened water to flow between the upstream and downstream zones. A conduit is axially located in the housing and has a first open end communicating with the downstream zone. A second end of the conduit forms an outlet of the device. A check valve is located at the first end of the conduit for allowing unidirectional flow of water undergoing softening from the downstream zone to the conduit, the check valve restricting flow between the zones during brine regeneration. Channels are formed in the plate and have inlets communicating with the conduit and outlets communicating with the upstream zone for creating a separate flow path, in the absence of water undergoing softening, for a regenerative brine wash directly between the conduit and the filtering material, in a direction opposite that of water undergoing softening.

8 Claims, 2 Drawing Sheets

DEVICE FOR DISTRIBUTING AND CHANNELING LIQUID WITHIN A WATER TREATMENT

This application is a continuation of U.S. patent application Ser. No. 08/422,541, filed Apr. 12, 1995, now abandoned.

FIELD OF THE INVENTION

The invention relates to a unit for treating a gaseous or liquid fluid such as, in particular, an ion exchange unit such as, for example, softeners. This unit aims to reduce the excessive (or high-titre) hardness of waters currently allocated for domestic, food or industrial uses.

BACKGROUND OF THE INVENTION

During the softening treatment, clear or clarified water passes through and in contact with a regenerable resin of the cationic type. During its passage, the ions, in particular calcium and magnesium ions, dissolved in the water are exchanged with the sodium ions in the resin. Thus, at the outlet of the softener, sodium mineralization has substituted for the calcium and magnesium mineralization. However, this operation does not change the anion (sulfate, chloride, etc.) content of the water.

The resins are regenerated using a brine (highly concentrated solution of sodium chloride). The sodium ions in this brine, present in a large quantity, flush the calcium and magnesium ions bound to the resin and allow the latter to recover its sodium form. Conventional ion exchange units use resins having well-determined characteristics. Thus, as a function of the volume of water to be softened, it is possible to dimension a softener by calculating the volume of resin required to be incorporated within the apparatus.

These units often therefore have a very large volume, thereby limiting the degree to which they can be integrated as close as possible to their site of use, and this drawback becomes very substantial in the case of domestic use.

Thus, new resins have been studied with a view to applying them in the field of water treatment. Although their properties are of particular interest, the hydraulic constraints linked with their use are fairly strict and require considerable modifications in the design and production of the apparatuses.

BRIEF DESCRIPTION OF THE INVENTION

The present invention proposes to overcome these drawbacks by providing a channeling device which is compatible with compact softeners, the latter being filled with a resin having a high exchange efficiency.

These resins have thus required the development of devices for distributing and channeling the various flows in the conventional use phase and in the regeneration phase.

This device should, on the one hand, allow passage through the resin or any filtering material of a liquid to be treated, it being necessary for the flow to take place in a preferred direction and at a given speed in order to comply with the specifications for using the resin such as, in particular, the contact time necessary for the ion exchange reaction and, on the other hand, allow movement through this same filtering material, also in a favorable direction and at a given speed, of a regeneration fluid such as, in particular, a brine.

For this purpose, the device for distributing and channeling liquid, which forms the subject matter of the invention, within a water treatment unit containing a filtering material, comprises, in particular a plate, separating the treatment unit into an upstream zone containing the filtering material and a downstream zone, provided with at least two separate parts forming channeling networks, one of them being pierced by a plurality of orifices which allow passage of the treated fluid which has passed through the filtering material between the upstream zone and the downstream zone, which communicate, via a channeling orifice which can be closed off as a function of the flow direction of the fluid, with the second part of said plate and the network for discharging the treated fluid, the complementary part being furthermore provided, on one of the faces of the plate, with a plurality of openings which allow flow of the regenerating fluid within said filtering material during the regeneration phase, said regenerating fluid being introduced via the network for withdrawing the treated fluid.

Other features and advantages of the present invention will emerge from the following description, with reference to the attached drawings which illustrate one embodiment thereof which implies no limitation. In these figures:

DETAILED DESCRIPTION OF THE INVENTION

Figure 1:
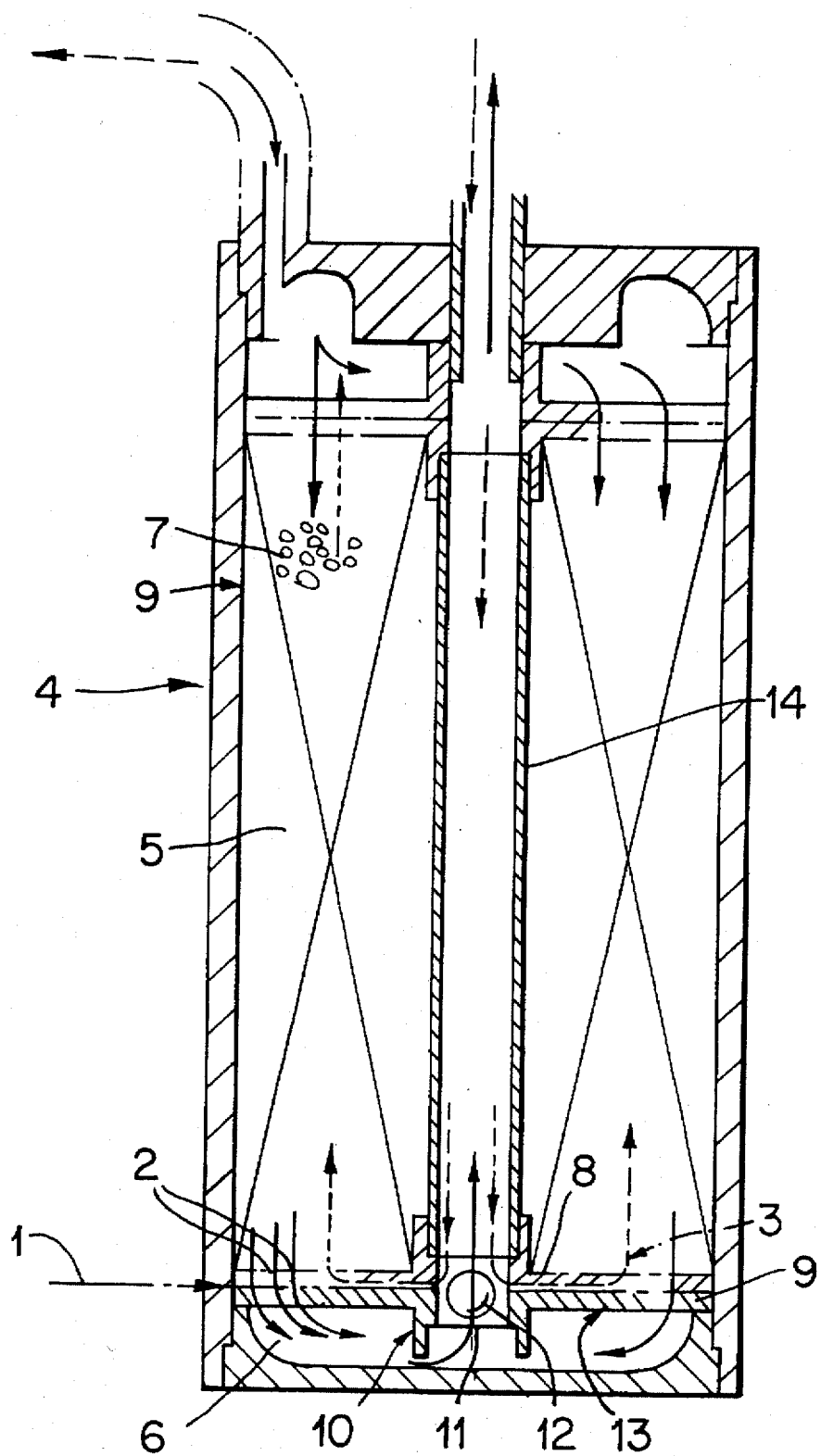
FIG. 1 is a plane sectional view of a softener provided with a distribution device.
Figure 2:
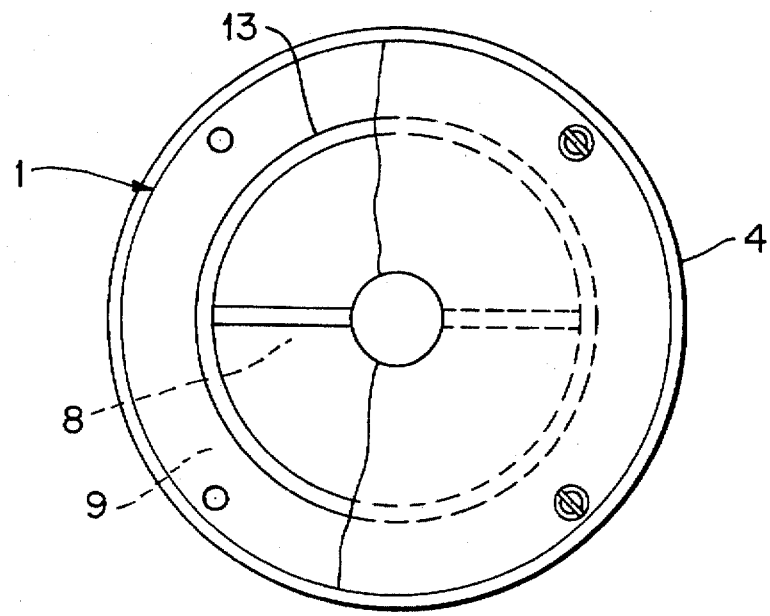
FIG. 2 is a plane view in front elevation of a distribution device.
Figure 3:
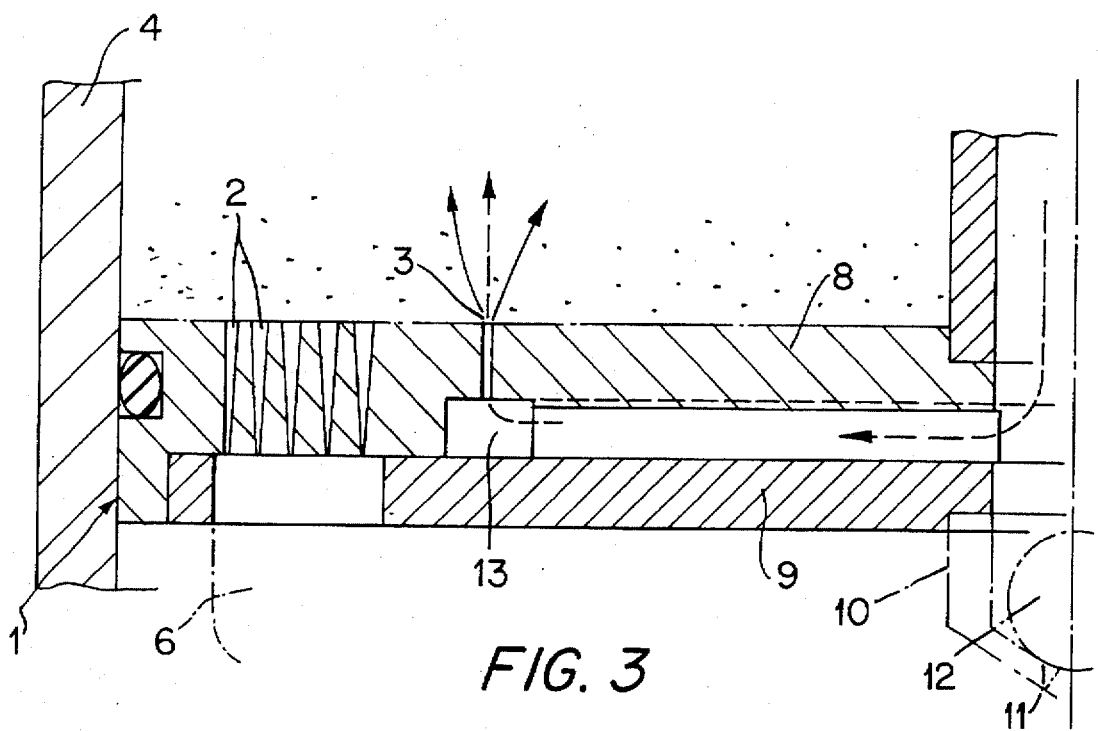
FIG. 3 is a half-sectional view, in plane elevation, of a distribution device.

According to a preferred embodiment of a device for channeling and distributing a regenerating fluid or a consumer fluid, it comprises a cavitied plate 1, in which the distribution of the cavities 2 and of the orifices 3 defines separate channeling networks. This plate is positioned in the treatment unit 4, either at an upper position or at a lower position in the latter, it extends parallel with respect to one of the ends of the treatment chamber 4 and it makes it possible to partition the chamber into an upstream zone 5 containing the filtering material 7, in particular resin, and a downstream zone 6 in communication with the withdrawal network during the utilization phase.

Thus, the majority of the plate is occupied by a plurality of cavities or openings 2 which allow passage of a fluid, generally the fluid which has just been treated, from the upstream zone 5 to the downstream zone 6. The distribution of these orifices on the plate 1 is preferentially annular and peripheral, the diameter and the number of these holes being a function of the hydraulic characteristics of the resin.

The complementary part 8 of the plate, generally the central part 10, does not communicate with the peripheral part 9 but is connected with the network for withdrawing or discharging the treated fluid, these two regions forming two separate fluid channeling and distribution networks. An axial conduit 14 connects central part 10 to the upper outlet.

According to another embodiment of the device according to the invention, the plate 1 comprises two thin discs, interlocked or optionally connected on their periphery by an edge which thus defines hollow spaces in the thickness of the plate. Similarly, a plurality of holes which connect the upstream zone and the downstream zone pass axially through this plate 1.

Regardless of the embodiment of the plate, the central zone 10 is provided, optionally in its lower part and facing the downstream zone 6, with at least one channeling orifice 11 which can be closed off by a body 12 such as, in particular, a ball, a needle or a blade forming a valve. The position of this body 12 with respect to the seat of the orifice 11 is defined as a function of the use of the apparatus and according to the direction of flow of the fluid. In the utilization phase, the seat of the channeling member permits flow, rather than being closed off, connecting the treated fluid with the withdrawal network whereas, in the regeneration phase, the seat is closed off and the regeneration fluid is channelled to the orifices 3 which are to diffuse brine through the resin of filtering layer 7.

Opposite this closable orifice 11, on the face in contact with the upstream zone and with the filtering material 7, a plurality of outlets 3 having a different diameter than those 2 placed in the peripheral part of the plate is arranged in one of the discs of the plate, in particular the complementary disc 8 and around the duct for withdrawing and discharging the fluid, it being possible for these holes 3 to be connected together by concentric and/or radial channels 13 which thereby define a meshed network capable of uniformly diffusing the regeneration fluid.

In a working phase for withdrawing a consumer fluid, the fluid passes inside the upstream zone 5 and therefore through the filtering layer 7. It enters the downstream zone 6 by virtue of the plurality of peripheral orifices 2 in the plate, then, having reached the front of the orifice 11 provided with its valve 12, in its flow-permitting direction, the fluid emerges into the central zone 10 of the plate 1 which is connected, in particular in the region of the upper disc, to the discharge and withdrawal duct.

In the regeneration phase, the regenerating fluid (brine) is introduced into the treatment unit 4 in countercurrent via the discharge duct if the device is placed in the lower part, but this circulation becomes cocurrent if the latter is placed in the upper part.

Thus, in a mode, for example, of countercurrent circulation, it directly reaches the internal cavity of the central zone 10 of the plate 1 but cannot pass beyond one of the discs of the plate, because in this direction of circulation, the body forming a valve 12 is pressed against the seat of the orifice 11. The regenerating fluid is therefore delivered through the orifices 3 of the complementary network of the plate and distributed over the entire lattice, in order to diffuse the sodium chloride rich solution through the saturated filtering layer 7, in particular the resin.

According to another embodiment, any one of the parts of the plate may be replaced by a membrane whose flow-resistance characteristics are a function of the direction of flow of the fluid passing through it. Thus, a plate according to the invention will consist of a concentric assembly of a plurality of rings and discs, oriented according to their position on the plate in a flow-permitting or blocking direction with respect to the direction of the treatment or regeneration fluid.

According to another embodiment, the orifices 3 for diffusing brine through the resin are replaced by small sieves or by a star-shaped network of ducts.

The present invention, as it has just been described, has very many advantages and, in particular, it allows the use of a high-efficiency resin, which greatly limits the waste discharge of a regenerating solution. The ratio, expressed in the following way: quantity of brine supplied relative to the quantity of ions captured by the resin, is very close to 1 with these types of resin and devices instead of from 1.7 to 2 for ordinary resins. Furthermore, this distribution device can be integrated inside a conventional softener provided with a conventional resin, in order to bring said ratio closer to 1.

It remains evident that the present invention is not limited to the exemplary embodiments described and represented hereinabove, but that it encompasses all variants thereof.

We claim:

1. A water softening device for use in a water treatment unit, the device comprising:

a housing;

an inlet formed at one end of the housing for admitting water to be softened;

a softening material located in an upstream zone adjacent the inlet;

a plate positioned in relative spaced relation to an opposite end of the housing;

a downstream zone, free of softening material, located between the plate and the opposite end;

openings formed in the plate to allow passage of softened water to flow between the upstream and downstream zones;

a conduit longitudinally located in the housing and having a first open end communicating with the downstream zone;

a second end of the conduit forming an outlet for the device;

means for introducing a brine wash at the second end of the conduit for regenerating the softening material;

check valve means located at the first open end of the conduit for allowing unidirectional flow of water undergoing softening from the downstream zone to the conduit, and restricting flow therebetween during brine regeneration of the softening material; and channels formed in the plate and having inlets communicating with the conduit and outlets communicating with the upstream zone for creating a separate flow path, in the absence of water undergoing softening, for distributing a regenerative brine wash directly between the conduit and the softening material, in a direction opposite that of water undergoing softening, the brine wash introduced at the second end of the conduit during brine regeneration.

2. The device as set forth in claim 1 wherein the plate openings are annularly located about the plate periphery and having a predetermined number and diameter.

3. The device as set forth in claim 1 wherein the channel outlets have a diameter different than the diameter of the plate openings.

4. The device as set forth in claim 1 including concentric and radial channels to uniformly distribute the regeneration brine through the softening material.

5. The device as set forth in claim 1 including concentric channels to uniformly distribute the regeneration brine through the softening material.

6. The device as set forth in claim 1 including radial channels to uniformly distribute the regeneration brine through the softening material.

7. The device as set forth in claim 1 wherein the channel outlets further comprise sieve members.

8. The device as set forth in claim 1 wherein the channel outlets further comprise star shaped openings.

* * * * *